US010282008B2

(12) United States Patent
Chung et al.

(10) Patent No.: US 10,282,008 B2
(45) Date of Patent: May 7, 2019

(54) TOUCH DISPLAY DEVICE

(71) Applicant: LG Display Co., Ltd., Seoul (KR)

(72) Inventors: Jinsoo Chung, Paju-si (KR); TaeHoon Kim, Paju-si (KR); JeongKil Seo, Paju-si (KR); DongHoon Lee, Paju-si (KR); JunWook Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 116 days.

(21) Appl. No.: 15/664,779

(22) Filed: Jul. 31, 2017

(65) Prior Publication Data

US 2018/0059838 A1 Mar. 1, 2018

(30) Foreign Application Priority Data

Aug. 31, 2016 (KR) ........................ 10-2016-0112095

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/136286* (2013.01);
(Continued)

(58) Field of Classification Search
CPC ...... G06F 3/0412; G06F 3/044; G06F 3/0416; G02F 1/13338; G02F 1/136286; G09G 3/3688; G09G 2310/0297; G09G 3/3275; G09G 2354/00; G09G 2310/08; G09G 2320/0257; G09G 2330/023; G09G 2330/022
(Continued)

(56) References Cited

U.S. PATENT DOCUMENTS

2010/0194695 A1* 8/2010 Hotelling .............. G06F 3/0412
345/173
2010/0253639 A1* 10/2010 Huang .................. G06F 3/0412
345/173
(Continued)

FOREIGN PATENT DOCUMENTS

| CN | 105609037 A | 5/2016 |
| EP | 2224277 A1 | 9/2010 |
| EP | 3037933 A2 | 6/2016 |

OTHER PUBLICATIONS

European Extended Search Report, European Application No. 17188102.2, dated Jan. 8, 2018, 20 pages.
(Continued)

*Primary Examiner* — Chineyere D Wills-Burns
(74) *Attorney, Agent, or Firm* — Fenwick & West LLP

(57) ABSTRACT

A touch display device. A touch display panel includes a source multiplexer switching the transfer of source signals to data lines. In a low power wake-up gesture (LPWG) mode in which a touch input is only sensed in a state in which a display function is off to reduce power consumption, a source multiplexer control signal is provided to set the source multiplexer in an on state, in synchronization with a touch sensing section in which a touch driving signal is provided. This can discharge electric charges generated within the display panel, thereby preventing display defects due to the electric charges.

20 Claims, 17 Drawing Sheets

(51) Int. Cl.
  *G06F 3/044* (2006.01)
  *G09G 3/36* (2006.01)
  *G09G 3/3275* (2016.01)
  *G02F 1/1362* (2006.01)

(52) U.S. Cl.
  CPC ............ *G06F 3/044* (2013.01); *G06F 3/0416* (2013.01); *G09G 3/3688* (2013.01); *G09G 3/3275* (2013.01); *G09G 2310/0297* (2013.01); *G09G 2310/08* (2013.01); *G09G 2320/0257* (2013.01); *G09G 2330/022* (2013.01); *G09G 2330/023* (2013.01); *G09G 2354/00* (2013.01)

(58) Field of Classification Search
  USPC ......................................................... 345/174
  See application file for complete search history.

(56) References Cited

U.S. PATENT DOCUMENTS

| | | | | |
|---|---|---|---|---|
| 2011/0216039 A1* | 9/2011 | Chen | ..................... | G06F 3/0412 345/174 |
| 2014/0145985 A1* | 5/2014 | Akai | ..................... | G06F 1/3215 345/173 |
| 2014/0253497 A1* | 9/2014 | Chen | ..................... | G06F 3/0416 345/174 |
| 2014/0347320 A1* | 11/2014 | Ribeiro | ................. | G06F 3/0412 345/174 |
| 2015/0161954 A1* | 6/2015 | Tokita | ................... | G06F 3/0412 345/174 |
| 2015/0378508 A1* | 12/2015 | Kim | ....................... | G06F 3/044 345/174 |
| 2016/0266673 A1* | 9/2016 | Dinu | ..................... | G06F 3/044 |
| 2016/0357320 A1* | 12/2016 | Ito | ......................... | G06F 3/0416 |
| 2017/0010739 A1* | 1/2017 | Ito | ......................... | G06F 3/0416 |
| 2017/0192558 A1* | 7/2017 | Xi | ......................... | G06F 3/0412 |
| 2017/0269772 A1* | 9/2017 | Noto | ..................... | G06F 3/0416 |
| 2017/0329167 A1* | 11/2017 | Kim | ...................... | G06F 3/0418 |

OTHER PUBLICATIONS

European Partial Search Report, European Application No. 17188102.2, dated Oct. 10, 2017, 19 pages.

* cited by examiner

TOUCH DISPLAY DEVICE

CROSS REFERENCE TO RELATED APPLICATION

This application claims priority from Korean Patent Application No. 10-2016-0112095, filed on Aug. 31, 2016, which is hereby incorporated by reference for all purposes as if fully set forth herein.

BACKGROUND

Field

The present disclosure relates to a touch display device, and more particularly, to a touch display panel able to prevent display defects while a low-power display operation is being stopped.

Description of Related Art

In response to the development of the information society, demand for a variety of display devices for displaying images is increasing. In this regard, a range of display devices, such as liquid crystal display (LCD) devices, plasma display panels (PDPs), and organic light-emitting diode (OLED) display devices, have recently come into widespread use.

Among such display devices, a LCD device includes an array substrate having thin-film transistors (TFTs), a top substrate having a color filter and/or a back matrix layer, and a liquid crystal layer sandwiched between the array substrate and the top substrate. The LCD device adjusts the orientation of the liquid crystal layer by applying an electric field between both electrodes in a pixel area, thereby regulating the light transmittance of the liquid crystal layer, so that an image is displayed.

A display panel of the LCD device has an active area (AA) and a non-active area (NA) defined thereon, the active area providing images to a user and the non-active area surrounding the active area. The display panel is fabricated by bonding a first substrate and a second substrate to each other. The first substrate is an array substrate on which TFTs are provided to define pixel areas, while the second substrate is a top substrate on which the black matrix layer and/or the color filter layer are provided.

The array substrate or the first substrate having the TFTs includes a plurality of gate lines (GL) extending in a first direction and a plurality of data lines (DL) extending in a second direction perpendicular to the first direction, in which a single pixel area (P) is defined by each of the plurality of gate lines (GL) and a corresponding one of the plurality of data lines (DL). In each pixel area P, one or more TFTs are provided, and gate and source electrodes of each TFT are connected to a corresponding gate line and a corresponding data line.

In addition, a gate driver (or a gate driving circuit) or a data driver (or a data driving circuit) are provided in the non-active area or outside of the display panel to provide the gate lines and the data lines with gate signals and data signals required for the operation of the pixels.

In particular, a variety of signal lines, through which voltage signals, clock signals, and the like are provided, and in some cases, a gate driving circuit, in the form of a gate-in-panel (GIP) disposed within the display panel, may be provided in the non-active area of the display panel.

Recently, display panels generally have a touch sensing function to sense a touch input performed using a stylus, a finger of a user, or the like. The development of such display panels is divided into a display panel in which a touch screen is separately fabricated and disposed on a display panel and a touch integrated display panel in which touch electrodes necessary for touch sensing are provided within the display panel when the display panel is fabricated.

In the touch integrated display panel, electric charges may be undesirably formed in the display panel in specific conditions, thereby causing display defects, such as stains or afterimages, which are problematic.

BRIEF SUMMARY

Various aspects of the present disclosure provide a touch display panel able to prevent display defects in a display-off state of the display panel.

Also provided is a touch display panel able to prevent display defects caused by electric charges generated within the display panel, in a low power wake-up gesture (LPWG) mode in which a touching pressure is only sensed while a display function is turned off for low power consumption.

Also provided is a touch display panel able to form a channel, through which electric charges generated within the display panel can be discharged, by transferring a specific source multiplexer (S-MUX) control signal to a source multiplexer that switches source signals transferred to data lines while the display panel is operating in the LPWG mode.

Also provided is a touch display panel able to prevent display defects caused by electric charges by transferring an S-MUX control signal that sets a source multiplexer to an on state, in synchronization with a touch sensing section to which a touch driving signal is transferred, during an LPWG mode operation of the display panel.

According to one embodiment, a touch display device comprises: a touch display panel comprising pixels and touch electrodes for touch sensing, the pixels defined by intersection of gate lines with data lines, the touch display panel configured to operate in a first mode or a second mode, wherein during the first mode the touch display panel is configured to display an image and sense touch on the touch display panel, and during the second mode the touch display panel is configured to sense touch on the display panel but the touch display panel is prevented from displaying any image; a data driver configured to transfer source signals to the data lines of the touch display panel to display the image during the first mode, and the data driver configured to transfer a predetermined voltage to the data lines of the touch display panel during the second mode; a source multiplexer disposed between the data driver and the data lines, the source multiplexer configured to transmit the source signals to the touch display panel via the data lines during the first mode and transmit the predetermined voltage to the touch display panel via the data lines during the second mode; and a low power wake-up gesture controller configured to transmit a control signal to the source multiplexer during the second mode to turn on the source multiplexer during the second mode, the control signal synchronized with a touch driving signal transmitted to the touch electrodes for sensing touch during the second mode; wherein during the second mode the source multiplexer electrically connects the touch display panel with the predetermined voltage transferred by the data driver.

According to one embodiment, a method of operating a touch display device comprising a touch display panel comprises: during a first mode of the touch display panel, displaying an image on the touch display panel and sensing touch on the touch display panel; during a second mode of the touch display panel, sensing touch on the touch display panel and disabling the touch display panel from displaying any image; and during the second mode of the touch display panel, turning on a source multiplexer that is connected to the touch display panel using a control signal, the source multiplexer configured to transmit a predetermined voltage from a data driver to the touch display panel via data lines of the touch display panel during the second mode to disable the touch display panel from displaying any image, wherein the control signal used to turn on the source multiplexer is synchronized with a touch driving signal transmitted to touch electrodes of the touch display panel to sense touch during the second mode.

BRIEF DESCRIPTION OF THE DRAWINGS

The above and other objects, features and advantages of the present disclosure will be more clearly understood from the following detailed description when taken in conjunction with the accompanying drawings, in which:

FIGS. 3A and 3B are timing diagrams illustrating an operation of the display panel, illustrated in FIG. 1, in a normal state, in which FIG. 3A illustrates a state in which the display driving mode and the touch driving mode recur in an alternating manner, while FIG. 3B illustrates on/off control states of source multiplexer (S-MUX) elements during the display driving mode;

FIG. 10A and FIG. 10B illustrate two examples of touch display panels to which exemplary embodiments are applicable, in which FIG. 10A illustrates an in-cell touch structure, while FIG. 10B illustrates a C1T structure;

DETAILED DESCRIPTION

Figure 1:
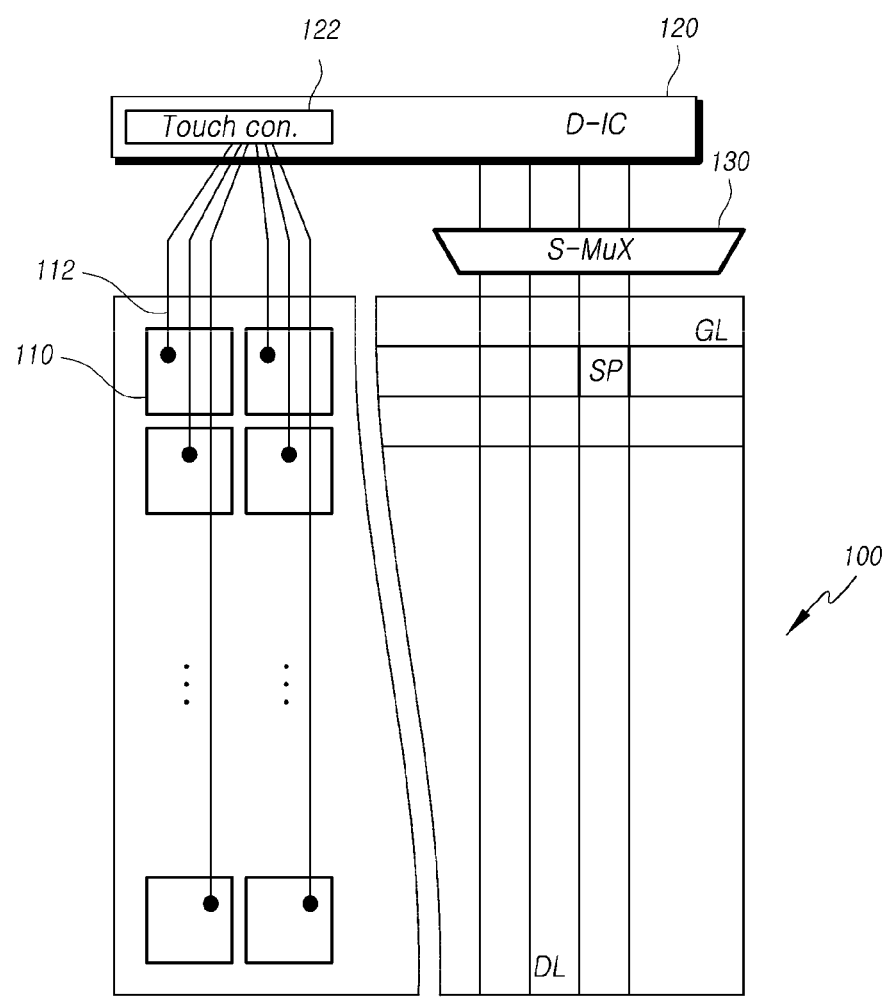
FIG. 1 is a plan view illustrating a touch integrated display panel to which exemplary embodiments are applicable, in which components necessary for a touch operation are generally illustrated on the left, and components necessary for image displaying are generally illustrated on the right.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

FIG. 1 is a plan view illustrating a touch integrated display panel to which exemplary embodiments are applicable. In FIG. 1, components necessary for a touch operation are generally illustrated on the left, and components necessary for image displaying are generally illustrated on the right.

A display panel to which the present disclosure is applicable is a touch display panel. More particularly, the touch display panel according to the present disclosure may be a touch integrated in-cell display panel in which touch electrodes are provided within the display panel. However, the present disclosure is not limited thereto, and the touch display panel may have a different structure, as illustrated in FIG. 10.

The touch display panel is fabricated by bonding a first substrate and a second substrate to each other. The first substrate is an array substrate having a plurality of pixel areas defined by a plurality of gate lines and a plurality of data lines intersecting the gate lines, with one or more thin-film transistors (TFTs) being provided in each of the pixel areas. The second substrate is a top substrate on which a black matrix layer and/or a color filter layer are provided.

The first substrate may also be referred to as a bottom substrate, a TFT substrate, or the like, while the second substrate may also be referred to as the top substrate, a color filter (CF) substrate, or the like.

The display panel is provided with a plurality of common electrodes Vcom in an active area. The common electrodes are used to apply a common voltage to pixels, such that an electric field is applied to a liquid crystal material due to the potential difference between the common electrodes and pixel electrodes.

In a typical display panel, a common electrode having a bulk planar shape may be provided. However, in the touch integrated display panel, the common electrodes are also used as touch electrodes to sense touches, in which the touch electrodes are separated according to positions to be touched. Thus, the common electrodes are provided as a plurality of touch electrodes in the active area, as illustrated in FIG. 1.

Here, each unit by which the touch electrodes are separated may be referred to as a "touch unit sensor." Herein, each touch unit sensor is referred to as a touch electrode for the sake of convenience.

As illustrated in FIG. 1, the touch integrated display panel is divided into an active area (AA) in the central portion and a non-active area (NA) surrounding the active area. A plurality of touch electrodes 110 are disposed in the active area.

The plurality of touch electrodes are connected to a data driver (D-IC) or a touch driver (T-IC) on one side of the panel (above the panel in FIG. 1) through touch driving lines 112, respectively.

A data driving circuit 120 acts as a controller that senses a touched position by transferring a specific signal or voltage to the plurality of touch electrodes 110 and then detecting amounts of capacitance in response to a touch manipulation.

Although the touch driver is illustrated herein as being integrated with the data driver (D-IC), the present disclosure is not limited thereto. Alternatively, the data driver and the touch driver may be provided separately.

In addition, the D-IC or the touch driver (T-IC) may be mounted on a chip-on-film (COF) in the form of a flexible printed circuit board (FPCG) to be connected to the display panel via bonding portions.

Herein, for the sake of convenience, a controller performing both a touch driving function and a data driving function will be referred to as the data driving circuit (or D-IC) 120.

The display panel may include a gate-in-panel (GIP) driver as a gate driving circuit directly provided on the display panel such that the GIP driver is disposed in the non-active area on one side of the panel (to the left of the panel in FIG. 1). However, the present disclosure is not limited thereto.

Touch sensing methods available for the touch integrated display panel may include mutual capacitance touch sensing in which touch electrodes are divided into touch electrodes Tx and sensing touch electrodes Rx to measure differences in capacitance between the touch electrodes Tx and the sensing touch electrodes Rx and self-capacitance touch sensing in which touch electrodes are arranged in the shape of a lattice on the same plane to measure an amount of self-capacitance.

In the self-capacitance touch sensing, among the mutual capacitance touch sensing and the self-capacitance touch sensing, all of the touch electrodes are provided as the plurality of touch electrodes 110 separated from each other.

The plurality of touch electrodes 110 are connected to the data driving circuit (D-IC) 120 through the touch driving lines 112. The touch driving lines 112 may be a metal layer that is referred to as an M3 layer.

Hereinafter, a method of driving the above-described touch integrated display panel will be briefly described.

A driving mode in which the display panel operates to display images is referred to as a "display driving mode," while a driving mode in which the display panel acts as a touchscreen panel is referred to as a "touch driving mode." In one embodiment, responsive to the display panel being in a "first mode," the display panel is configured to switch between the display driving mode and the touch driving mode. Thus, during the first mode the display panel is configured to display an image and sense touch on the display panel.

The display driving mode and the touch driving mode may be divided on the basis of time.

First, in the display driving mode, the data driving circuit 120 provides data voltages Vdata or source data for displaying images to the plurality of data lines DL.

When the driving mode of the panel is the display driving mode, a gate driver (not shown) sequentially provides scanning signals for displaying images to the plurality of gate lines GL to switch transistors, so that an image is displayed.

In the display driving mode, a common voltage Vcom is applied to the touch electrodes 110, also acting as the common electrodes, through the touch driving lines 112.

In the touch driving mode, the data driving circuit 120 transfers a touch driving signal Vtouch_vcom or a touch enable signal to all or any of the plurality of touch electrodes 110 connected thereto through the touch driving lines 112.

Here, the touch driving signal Vtouch_vcom or the touch enable signal may also be referred to as a "touch sensing signal," "touch sensing voltage," or "touch driving voltage."

The data driving circuit 120 can sense a touch and touched coordinates by detecting sensing data (e.g. capacitance, a change in capacitance, or a voltage) measured using the touch electrodes 110 by analyzing signals received through the touch electrodes 110.

A circuit for receiving and sensing such touch signals may be referred to as a touch controller (not shown).

As described above, the display panel of a touch integrated display device is driven to repeatedly alternate between the display driving mode and the touch driving mode during the first mode. The timing of the display driving mode and the timing of the touch driving mode can be controlled by control signals output by a timing controller or a touch controller, or may be controlled through the integrated actions of the timing controller and the touch controller.

The touch integrated display device 100 according to an exemplary embodiment may use a capacitance touch sensing method to sense a touch and touched coordinates based on changes in capacitance using the plurality of touch electrodes (e.g. rows of electrodes and columns of electrodes) disposed on the touchscreen panel.

The capacitance touch sensing method may be divided into mutual capacitance touch sensing and self-capacitance touch sensing, which will be described in more detail below with reference to FIG. 10.

The plurality of touch electrodes 110 used herein act as "touch electrodes," at least one of which has a touch driving signal transferred thereto when the driving mode is the touch driving mode. When the driving mode is the display driving mode, the plurality of touch electrodes 110 act as "common electrodes," to which a common voltage Vcom is applied, to form liquid crystal capacitors together with pixel electrodes disposed in the panel.

As illustrated in the right part of FIG. 1, the display panel 100 has the plurality of gate lines GL and the plurality of data lines DL. Each of areas in which the gate lines and the data lines intersect each other defines a single pixel or a single subpixel SP.

In addition, a source multiplexer 130 is disposed between the data driver (D-IC) 120 and the data lines to switch source signals or data driving voltages applied to the data lines.

The source multiplexer 130 is provided as a plurality of source multiplexer elements (hereinafter referred to as "S-MUX elements"), or a plurality of switching elements, connected to the data lines, respectively. For on/off control of the S-MUX elements, S-MUX control signals are transferred to the S-MUX elements, respectively. The data driver (D-IC) can control the transfer of the S-MUX control signals.

Figure 2:
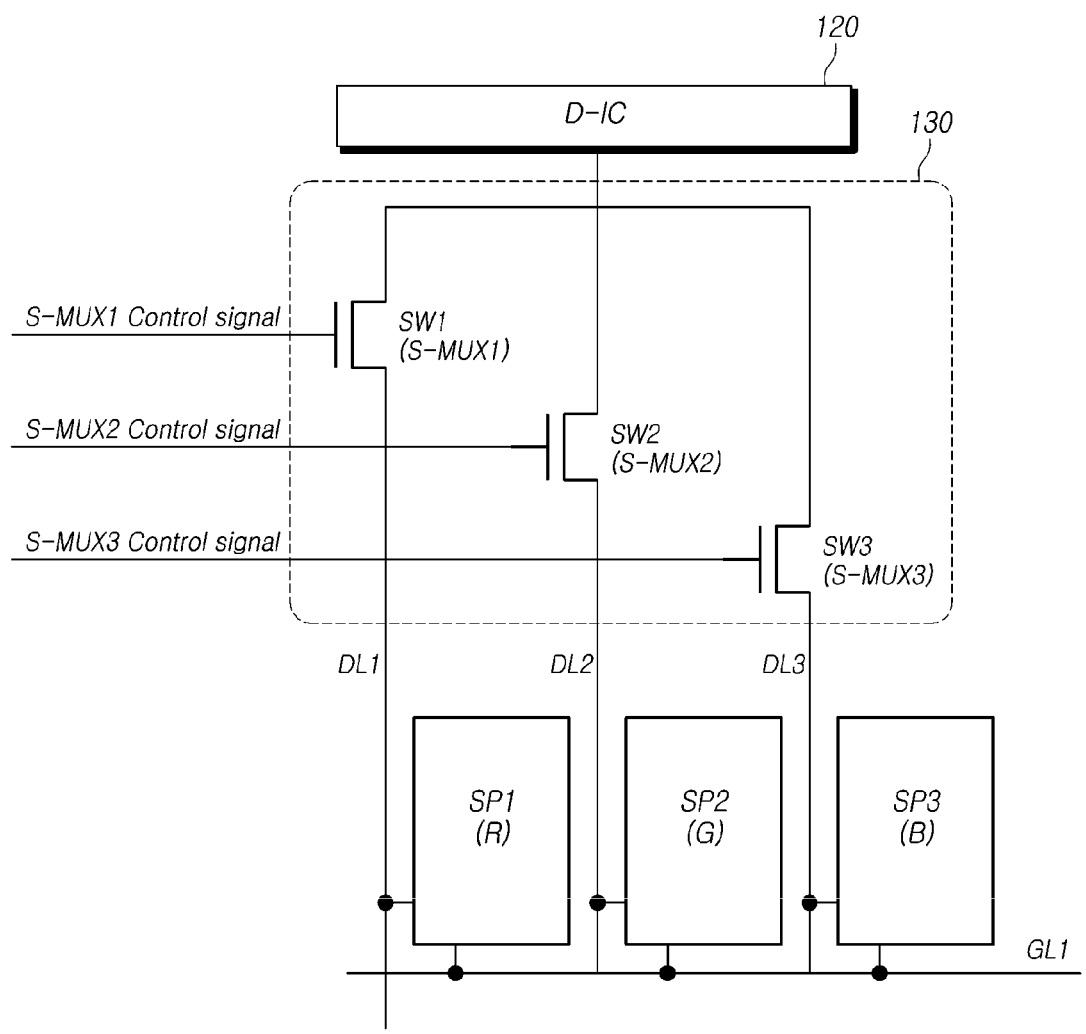
FIG. 2 illustrates a portion of the structure of the display panel including the source multiplexer to switch source signals transferred to the data lines according to one embodiment.

FIG. 2 illustrates a portion of the structure of the display panel including the source multiplexer to switch source signals transferred to the data lines.

As illustrated in FIG. 2, a plurality of S-MUX elements, acting as a plurality of switching elements, are disposed between the data driver (D-IC) 120 and the data lines, respectively. The S-MUX elements may be formed of thin-film transistors (TFTs).

More specifically, a single pixel consists of three subpixels, i.e. a red (R) subpixel SP1, a green (G) subpixel SP2, and a blue (B) subpixel SP3. The subpixels SP1, SP2, and SP3 are connected to data lines DL1 to DL3, respectively, and are connected a first gate line GL1.

In the display driving mode, a first scanning signal is transferred to the first gate line during a single horizontal period. At the same time, sequentially, a first source signal is transferred to the first data line DL1, a second source signal is transferred to the second data line DL2, and a third source signal is transferred to the third data line DL3.

Specifically, the single horizontal period is divided into three sub-horizontal sections. During the first sub-horizontal section, corresponding source signals are simultaneously transferred to $(n+1)^{th}$ data lines (n=0, 1, 2, ...) to output an image to all R subpixels of the display panel. During the second sub-horizontal section, corresponding source signals are simultaneously transferred to $(n+2)^{th}$ data lines (n=0, 1, 2, ...) to output an image to all G subpixels of the display panel. During the third sub-horizontal section, corresponding source signals are simultaneously transferred to $(n+3)^{th}$ data lines (n=0, 1, 2, ...) to output an image to all B subpixels of the display panel.

Accordingly, it is necessary to perform the on/off control of each of the S-MUX elements in order to transfer source signals only to corresponding data lines during the sub-horizontal sections.

That is, during the first sub-horizontal section, it is possible to transfer corresponding source signals only to the $(n+1)^{th}$ data lines by setting the $(n+1)^{th}$ S-MUX elements on and the remaining $(n+2)^{th}$ and $(n+3)^{th}$ S-MUX elements to the off state.

In this regard, S-MUX control signals (i=1, 2, 3) are transferred to the S-MUX elements through control lines CL, respectively. The S-MUX control signals may be generated by the data driver 120 or a separate timing controller (T-con).

Figure 3A:
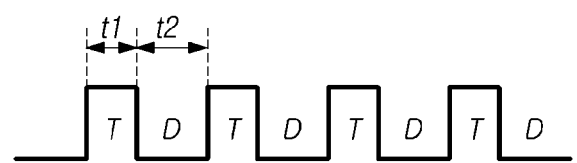
Figure 3B:
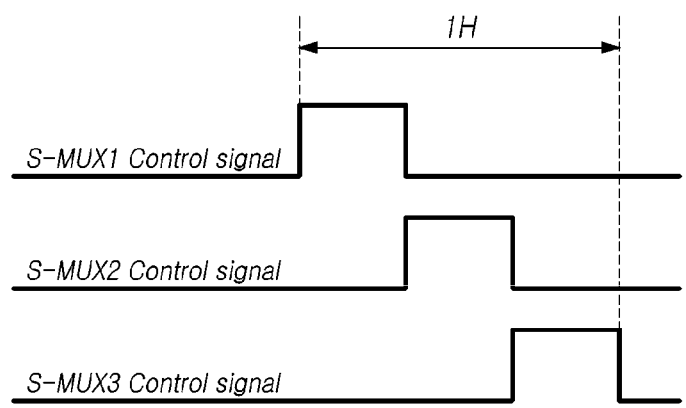

FIGS. 3A and 3B are timing diagrams illustrating an operation of the display panel, illustrated in FIG. 1, in a normal state (e.g., the first mode). FIG. 3A illustrates a state in which the display driving mode and the touch driving mode recur in an alternating manner, while FIG. 3B illustrates on/off control states of S-MUX elements during the display driving mode.

As described above, in a typical normal operation state, the touch display panel illustrated in FIG. 1 operates while repeatedly alternating between the display driving mode and the touch driving mode.

FIG. 3A illustrates the timing state of a normal operation mode with respect to a touch driving signal. During a touch sensing section t1, a touch driving signal is transferred to touch electrodes to sense an amount of touching pressure. During a subsequent display driving section t2, a common voltage is applied to common electrodes and the S-MUX elements, illustrated in FIG. 2, are sequentially set to be in the on state, so that an image is displayed on corresponding subpixels.

During the display driving section t2, as illustrated in FIG. 3B, S-MUX1, S-MUX2, and S-MUX3 control signals are sequentially transferred to corresponding S-MUX elements, i.e. S-MUX1, S-MUX2, and S-MUX3, so that S-MUX1, S-MUX2, and S-MUX3 are sequentially set to be in the on state during the divided three sub-horizontal sections of the single horizontal period.

Figure 4A:
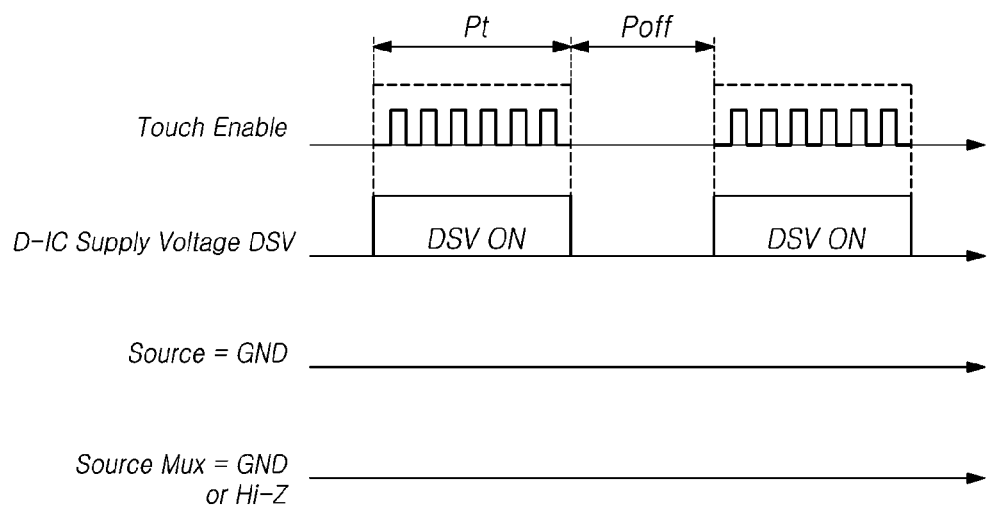
FIG. 4A is a signal timing diagram of the display panel, illustrated in FIG. 1, in a low power wake-up gesture (LPWG) mode.
Figure 4B:
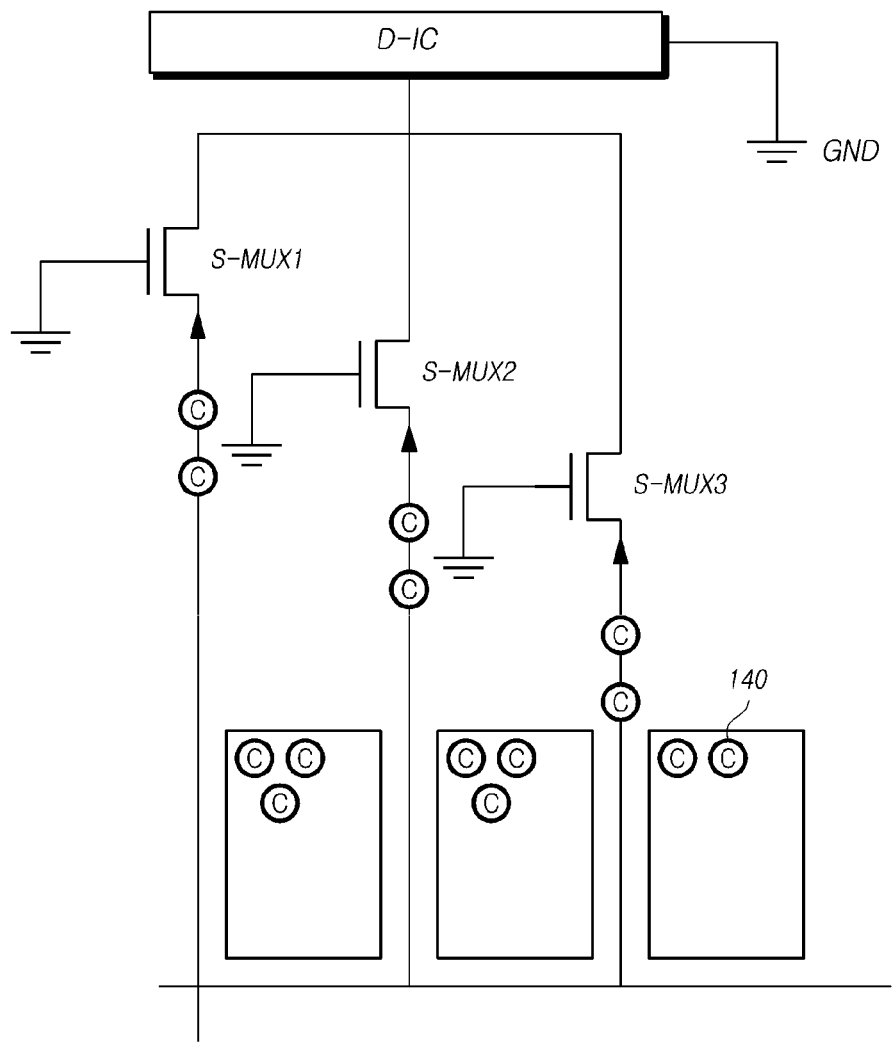
FIG. 4B illustrates paths along which electric charges generated in the LPWG mode flow according to one embodiment.

FIG. 4A is a signal timing diagram of the display panel, illustrated in FIG. 1, in a low power wake-up gesture (LPWG) mode (e.g., a second mode), and FIG. 4B illustrates paths along which electric charges generated in the LPWG mode flow.

Set devices, i.e. finished products, such as a mobile communication terminal or television (TV), are equipped with a display panel as illustrated in FIG. 1. Some of the set devices have a power saving function or a screen-off function in which the display panel is turned off when the operation of the set device is suspended for a predetermined period of time or longer.

When the display function is turned off for low power consumption during the LPWG mode, after a touch input, such as double tapping, in which the user wakes up the set device, is recognized, the operation of restarting the display panel must be performed.

In particular, recently, specific smartphones are equipped with a function of turning off the display panel in a standby mode and turning on the display function again in response to the display panel being double tapped.

The operation mode in which the set device continuously performs touch sensing during the temporary display-off state as described above may be referred to as low power wake-up gesture (LPWG) mode. During the LPWG mode, the display panel is configured to sense touch on the display panel but the display panel is disabled from displaying any images.

FIG. 4A is a signal timing diagram of the display panel, illustrated in FIG. 1, in the LPWG mode operation. In FIG. 4A, touch enable signals for controlling the input of touch driving signals to the touch electrodes, D-IC power supply signals DSV for supplying power to the data driver during the input of the touch driving signals, source signals provided to the data lines, and S-MUX control signals for controlling the S-MUX elements are illustrated.

As described above, in the LPWG mode, the display panel repeatedly operates in touch-on sections Pt and touch-off sections Poff, which are divided on the basis of time. In the touch-on section Pt, a touching pressure is sensed by transferring a touch driving signal. In the touch-off section Poff, neither a displaying operation nor a touch operation is performed.

At this time, the display panel senses an amount of touching pressure by transferring a touch driving signal during the touch-on section Pt but does not operate to supply power to the data driver (D-IC) without inputting a touch driving signal during the touch-off section Poff, since power consumption is required to be minimized.

As described in FIG. 4A, in the touch-on section Pt during the LPWG mode operation, a touch enable signal is on and a data driver power supply signal is on. In the touch-off section Poff during the LPWG mode operation, a touch enable signal is off and the data driver (D-IC) is powered off.

Since no displaying operation is performed in the LPWG mode, a source signal directed to the data lines is input as a predetermined voltage such as a ground signal GND, and an S-MUX control signal is input as a ground signal GND or is in a floating state Hi-Z.

FIG. 4B illustrates a state in which undesirable electric charges formed in the pixels or the like within the display panel during the LPWG mode are trapped in the display panel.

In general, a plurality of TFTs disposed on the display panel respectively include an active layer, i.e. a semiconductor layer, which performs switching between a source electrode and a drain electrode.

The active layer may be made of a silicon semiconductor, such as amorphous silicon (a-Si) or polysilicon (p-Si), an oxide semiconductor, or the like.

The TFTs including the active layer made of polysilicon (or crystal silicon) have merits of a relatively high level of mobility and stable static current characteristics. However, the active layer made of polysilicon has the following drawbacks: A high temperature fabrication process is required therefor, materials for a base substrate are limited, and it is difficult to implement uniform device characteristics. Thus, the active layer made of polysilicon cannot be easily used in a TFT array for large flat display devices.

In contrast, the active layer made of amorphous silicon can be manufactured in a lower temperature process, as compared to that of the active layer made of polysilicon, to achieve relatively uniform device characteristics. However, the active layer made of amorphous silicon has a lower level of mobility and unstable static current characteristics, as compared to the active layer made of polysilicon.

Recently, an oxide semiconductor having merits, such as a high level of mobility and low leakage current characteristics, has been proposed as a material for the TFT active layer. The oxide semiconductor used in this case is a crystalline or amorphous material composed of at least one selected from the group consisting of Zinc (Zn), cadmium (Cd), Gallium (Ga), Indium (In), Tin (Sn), Hafnium (Hf), and Zirconium (Zr) and oxygen ($O_2$). That is, the oxide semiconductor has a compositional formula: $A_xB_yC_zO$ (x, y, z≥0), in which A, B, and C are selected from among Zn, Cd, Ga, In, Sn, Hf, and Zr. In particular, the oxide semiconductor may be selected from among ZnO, InGaZnO4, ZnInO, ZnSnO, InZnHfO, SnInO, and SnO, but the present disclosure is not limited thereto.

In addition, a low-temperature polysilicon (LTPS) material, i.e. a polysilicon (or crystal silicon) that can be processed at a low temperature, may be developed to be used as a material for the TFT active layer.

The oxide semiconductor is an amorphous material that is regarded as being stable. When the semiconductor layers of the TFTs are made of the oxide semiconductor, several advantages can be obtained. For example, the TFTs can be fabricated at low temperature using existing processing equipment without the need for separate processing equipment to be additionally purchased, and an ion implantation process can be omitted.

However, despite the superior characteristics of the oxide semiconductor or the LTPS material, when a transistor is unused for an extended period of time, a threshold voltage shift may occur. This is referred to as negative bias temperature illumination stress (NBTIS) or negative bias illumination stress (NBIS).

When the TFTs made of the semiconductor oxide or the LTPS material are used, the TFT in each of the pixels is turned on for a short period of time corresponding to a single frame by a scanning signal corresponding to a gate on voltage to supply a pixel voltage to a liquid crystal capacitor Clc. Afterwards, the TFT is turned off by a scanning signal corresponding to a gate off voltage and remains in the turned off state for the remaining period of time.

Consequently, a negative bias is applied to the TFT of each pixel due to the gate off voltage for an extended period of time, thereby shifting the threshold voltage of the TFT toward a negative voltage. This phenomenon may be referred to as NBTIS or NBIS.

In the LCD display device using the oxide semiconductor as described above, the oxide TFT has an operation characteristic in that the threshold voltage thereof shifts toward a negative voltage when used for a long time. This may cause reliability degradation, such as an increase in an off current, thereby leading to a display defect, such as vertical crosstalk or a light spot defect.

Not only the normal operation but also the LPWG mode operation may be influenced by the NBIS phenomenon. Undesirable electric charges may be formed in the pixels, due to the threshold voltage shift.

Hereinafter, the reason why undesirable electric charges are generated in the active area of the display panel during the LPWG mode will be described by way of example.

In the LPWG mode, the threshold voltage of the TFT of the oxide semiconductor or the LTPS material may be significantly shifted to a negative value, since the TFT made may be turned off for an extended period of time. When the display panel is exposed to light, such as the sunlight, for an extended period of time, the threshold voltage is further shifted to the negative value by the light, so that the TFT may be undesirably turned on.

In this state, when a touch driving signal is input to the touch electrode (common electrode) in the touch-on section Pt of the LPWG mode, undesirable electric charges may be generated in the pixel due to the lowered threshold voltage of the pixel TFT.

In addition to the NBIS, when the pixel is exposed to strong light for an extended period of time in the LPWG mode, impurities contained in the TFT may react with the light to discharge ions. Such ions may generate direct current (DC) components in the display panel.

As described above, when the undesirable electric charges generated in the LPWG mode are not discharged from the display panel, the DC components may be generated in the pixel of the display panel, thereby causing a display defect.

However, as illustrated in FIG. 4A, in the LPWG mode, the S-MUX control signal for the transfer of source signals is the ground signal GND or in the floating (high-impedance) state Hi-Z, thereby causing the source multiplexer to be in an unstable switching state.

That is, as illustrated in FIG. 4B, the source multiplexer is set to be in the off state or is in the unstable switching state during the LPWG mode, so that electric charges undesirably generated within the display panel during the LPWG mode are blocked by the source multiplexer. Consequently, the undesirable electric charges may accumulate in the display panel without being discharged from the D-IC or the like.

The electric charges 140 accumulated in the display panel as described above may cause defects, such as stains or afterimages, in the pixels of the display panel, due to the DC components.

That is, when the electric charges 140 are not discharged in the LPWG mode, the problem of undesirable display defects, such as stains or afterimages, may occur in the display panel.

Accordingly, exemplary embodiments are intended to reduce the above-described display defects by forming a channel, through which electric charges generated within the display panel during the LPWG mode can be discharged, by inputting an S-MUX control signal to set the source multiplexer to be in an on state, in synchronization with a touch sensing signal, in the LPWG mode.

Hereinafter, exemplary embodiments will be described in detail with reference to FIG. 5 to FIG. 13.

Figure 5:
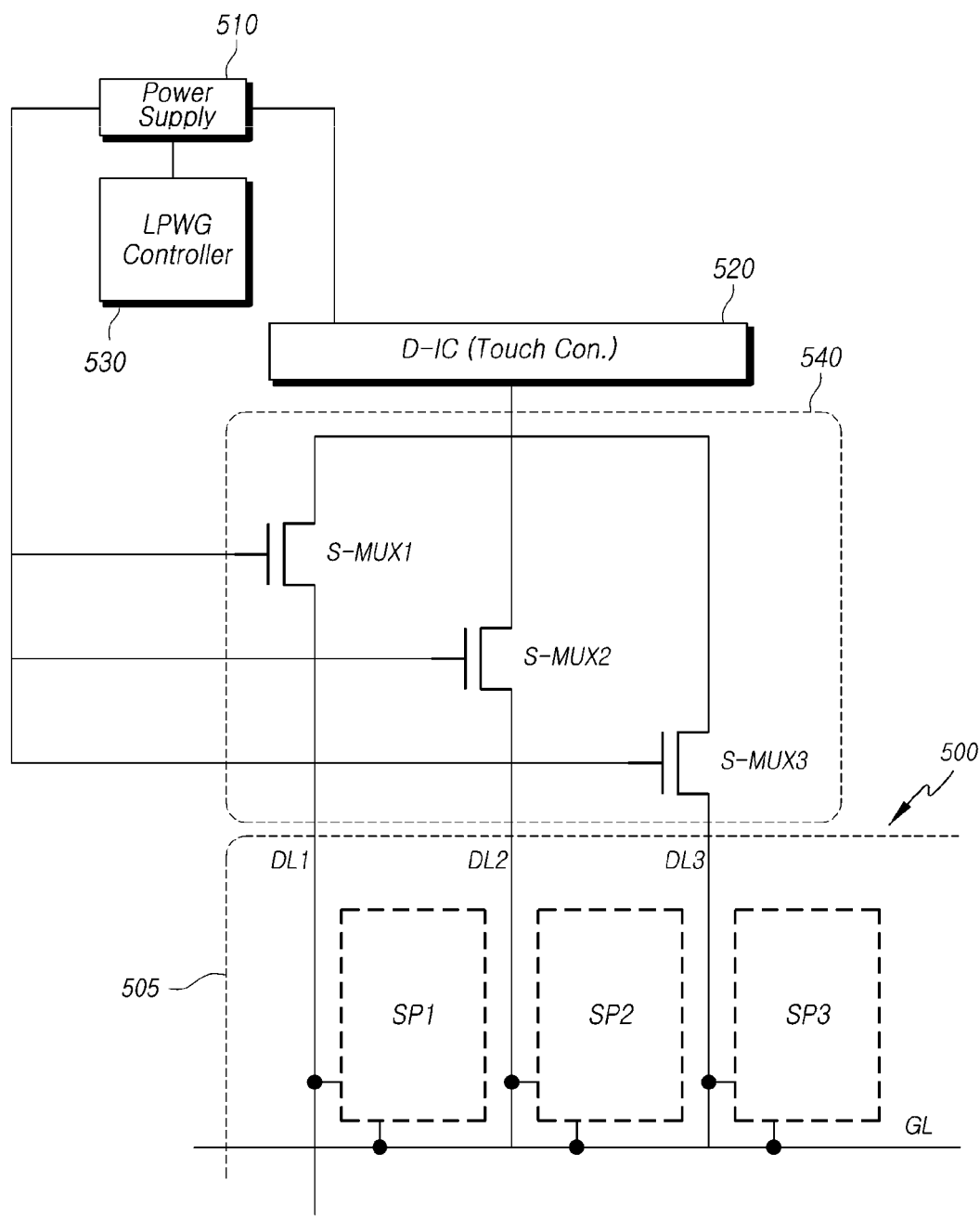
FIG. 5 illustrates the configuration of a display device according to an exemplary embodiment.

FIG. 5 illustrates the configuration of a display device according to an exemplary embodiment.

As illustrated in FIG. 5, the touch display device according to the exemplary embodiment includes: a touch display panel 500 having pixels SP (SP1, SP2, SP3) disposed in areas in which gate lines GL and data lines DL (DL1, DL2, DL3) intersect each other and touch electrodes 505 configured to sense touches; a data driver (D-IC) 520 transferring source signals to the data lines; a source multiplexer 540 disposed between the data driver and the data lines DL1, DL2, and DL3 to switch the transfer of the source signals to the data lines DL1, DL2, and DL3; and an LPWG controller 530 providing an S-MUX control signal to turn the source multiplexer 540 on and off in an LPWG mode in which touch sensing is only performed in a display-off state.

In the LPWG mode, the LPWG controller 530 inputs an S-MUX control signal to turn on the source multiplexer 540 in synchronization with a touch enable signal that is input to the touch electrodes 503 to enable touch sensing.

Here, in the LPWG mode, the data driver (D-IC) always inputs a ground signal GND as a source signal, so that electric charges generated within the display panel during the LPWG mode can flow toward the driver as the source multiplexer 540 is turned on.

Although the touch display panel 500 may be a liquid crystal display panel, the present disclosure is not limited thereto. The touch display panel may be any touch display panels including pixels defined in areas in which data lines intersect gate lines and a source multiplexer able to switch the transfer of source signals to the data lines. For example, the concept of the touch display panel may include any touch display panels, such as an organic light-emitting diode (OLED) display panel and an electrophoresis display panel.

However, the touch display device according to the exemplary embodiment is required to be able to realize a low power wake-up gesture (LPWG) mode in which the display function of the display device can be suspended for a predetermined period of time and a wake-up touch input, such as double tapping, for restarting the display panel, can be sensed.

Although the operation mode in which touch sensing is continuously performed in the temporary display-off state of the set device may be referred to as the LPWG mode as described above, the present disclosure is not limited thereto.

Herein, for the sake of convenience, any mode in which the display function is turned off for the lower power consumption of the display panel but the touch sensing operation for recognizing touch inputs for the restarting of the display panel is performed will be collectively referred to as the low power wake-up gesture (LPWG) mode.

The touch display device operates in both a display operation mode and a touch operation mode in a normal mode. Although the display operation mode and the touch operation mode can recur, divided on the basis of time, the present disclosure is not limited thereto.

The data driver (D-IC) 520 may also be referred to as a data driving circuit. The concept of the data driver (D-IC) 520 includes any type of controller that can work in concert with an external power supply 510 and a timing controller (T-con, not shown) to provide the data lines in the display panel with source signals or data driving voltages for displaying images.

The data driver 520, having the function of transferring source signals, may include a touch driver to transfer a touch driving signal to the touch electrodes and sense a touch input by measuring values (of capacitance) received from the touch electrodes.

In addition, the touch display device according to the exemplary embodiment may further include a power supply 510 or a power manager. The power supply 510 acts to generate a variety of power sources or driving voltages necessary for the display device and provide the variety of power sources or driving voltages to the data driver.

Driving voltages that can be used in the data driver 520 include a logic voltage IoVcc having a low level of about 1.8V and an analog voltage of about 2.8V to 3.3V. In addition, a direct supply voltage (DSV) of about ±5.5V to ±6.5V or the like may be used.

When the direct supply voltage is not used, the power supply 510 can generate a source reference voltage of about ±5.5V to ±6.5V by first boosting an analog voltage to use the generated source reference voltage as a main supply voltage of the data driver. When a direct supply voltage is used, the direct supply voltage can directly be used as a main supply voltage of the data driver.

In addition, the power supply 510 can generate a voltage of about ±9V by boosting an analog voltage or a direct driving voltage to use the generated voltage as a gate driving voltage.

Here, the LPWG controller 530 can generate an S-MUX control signal based on the analog voltage or the direct supply voltage.

Types of driving sources used in the exemplary embodiment, as well as types of power sources used by the LPWG controller 530 to generate an S-MUX control signal, will be described in more detail with reference to FIGS. 8A and 8B.

The concept of the source multiplexer 540 includes any type of device or circuit that is disposed between the data lines and the data driver to switch the transfer of source signals from the data driver to the data lines.

The source multiplexer 540 is constantly in the off state during the touch operation mode in the normal mode. During the display operation mode, the source multiplexer 540 is controlled by the data driver to be turned on only at a point in time in which source signals are supplied to the corresponding data lines.

Figure 6:
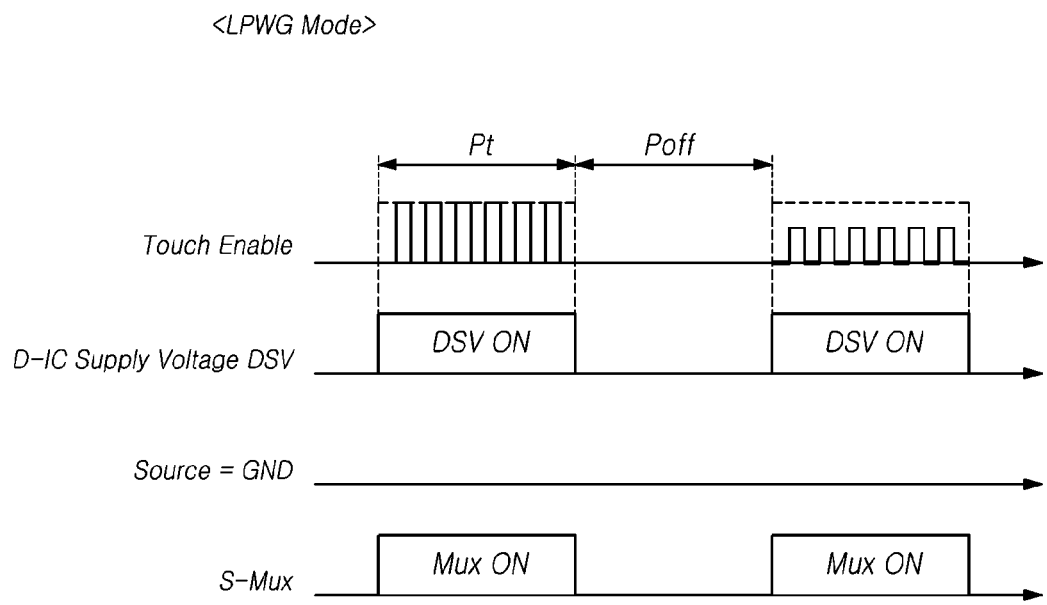
FIG. 6 is a signal timing diagram in an LPWG mode according to an exemplary embodiment.

FIG. 6 is a signal timing diagram in the LPWG mode according to an exemplary embodiment.

As illustrated in FIG. 6, in the LPWG mode, an on section Pt in which touch sensing is performed and an off section Poff in which touch sensing is not performed recur in an alternating manner. Here, no display operation is performed on all sections of the LPWG mode.

A touch enable signal is on in the touch no section Pt, so that a touch driving voltage is applied to the touch electrodes to sense an amount of touching pressure.

As described above, the data driver also controls touch driving. Thus, in a touch-on section of the LPWG mode, the data driver must be powered on. In a touch-off section of the LPWG mode, both the touch enable signal and the power of the data driver are off to minimize power consumption.

Differently from the description with reference to FIG. 4, in which the S-MUX elements remain in the ground or high-impedance state during the LPWG mode, S-MUX control signals are transferred to the S-MUX elements to turn on all of S-MUX elements in the touch-on section of the LPWG mode according to the exemplary embodiment.

According to the exemplary embodiment, in the LPWG mode, the LPWG controller 530 inputs the S-MUX control signals in synchronization with the touch enable signal, input to the touch electrodes 505 for touch sensing, to set the on state in the S-MUX elements.

As illustrated in FIG. 6, the on-pulse width of the S-MUX control signals may be the same as the pulse width of the touch enable signal, but the present disclosure is not limited thereto. The on-pulse width of the S-MUX control signals may be greater than the pulse width of the touch enable signal. This will be described in more detail with reference to FIG. 9.

As illustrated in FIG. 6, according to the exemplary embodiment, source signals are always input as ground signals in the LPWG mode.

Figure 7:
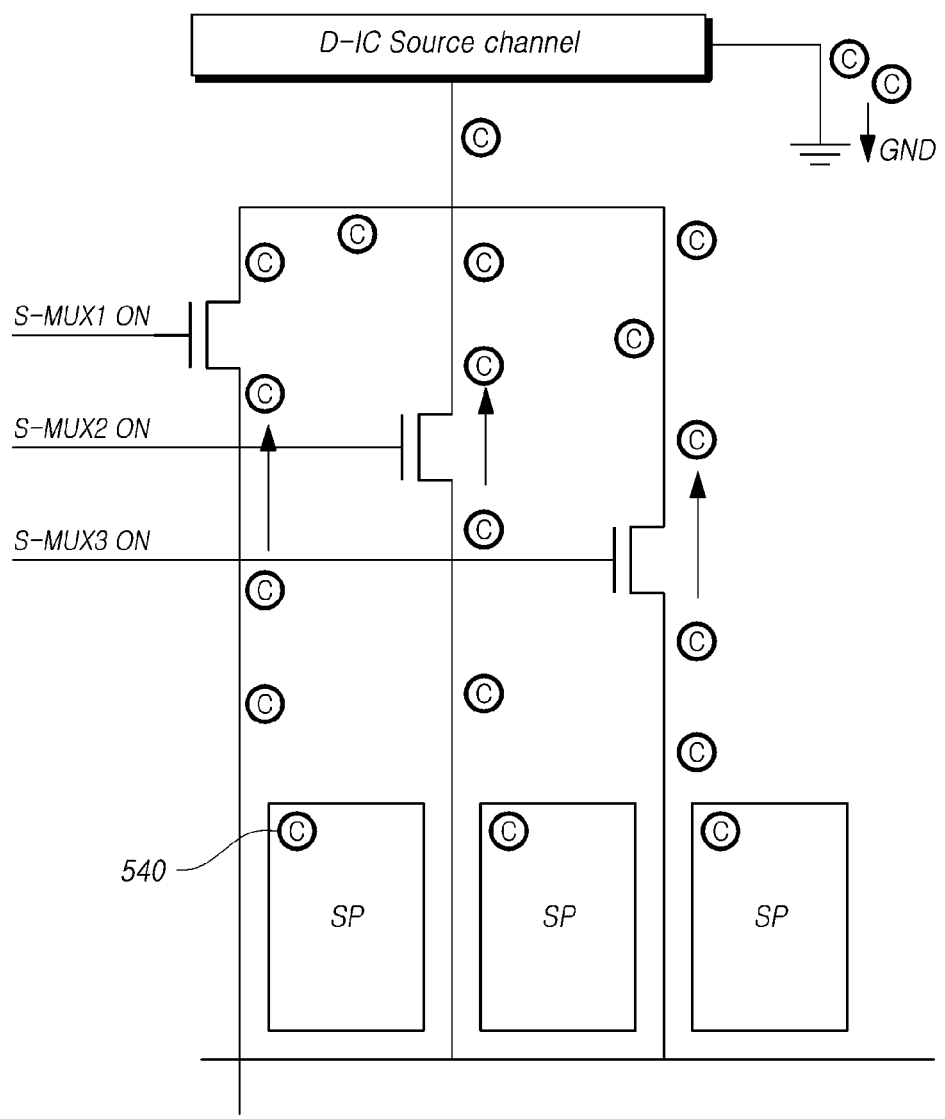
FIG. 7 illustrates a state in which electric charges are discharged from the display device according to the exemplary embodiment in the LPWG mode.

FIG. 7 illustrates a state in which electric charges are discharged from the display device according to the exemplary embodiment in the LPWG mode.

As described above, according to the exemplary embodiment, S-MUX control signals are transferred to the S-MUX elements in a touch-on section of the LPWG mode, so that all of the S-MUX elements can be set to be in an on state.

Thus, in the touch-on section of the LPWG mode, all of the S-MUX elements are set to be in the on state, thereby causing the data driver to be electrically connected to the data lines. Consequently, as illustrated in FIG. 7, in the LPWG mode, electric charges generated within the display panel can be discharged through the data driver.

Specifically, in the LPWG mode, when the display panel is exposed to strong light, electric charges may be generated within the display panel. Since the S-MUX elements are in the on state and the data driver is in the ground state (source=GND) in the touch-on section of the LPWG mode, the generated electric charges flow to the data driver along the data lines and then are to a ground GND.

This can consequently reduce display defects, as described above with reference to FIG. 4, that would otherwise be caused by electric charges generated within the display panel or by resultant DC components.

Figure 8A:
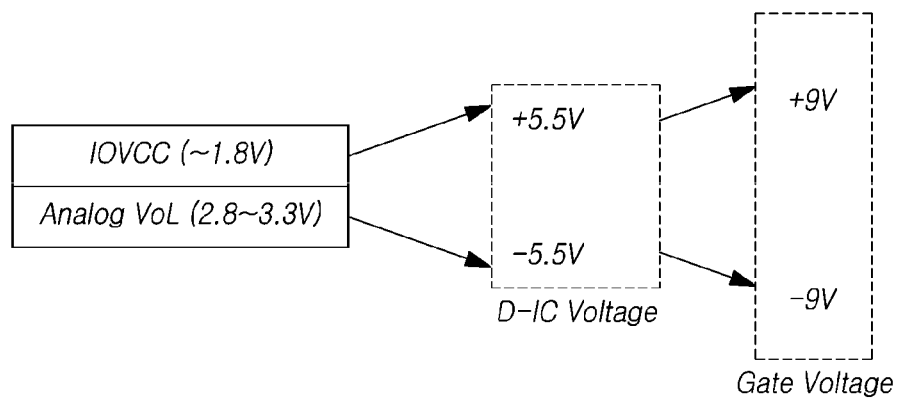
FIGS. 8A and 8B illustrate an example of a supply voltage configuration in the display device according to the exemplary embodiment.
Figure 8B:
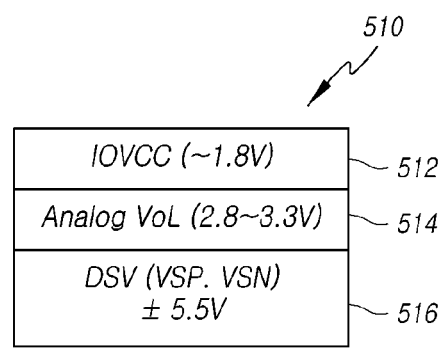

FIGS. 8A and 8B illustrate an example of a supply voltage configuration in the display device according to the exemplary embodiment.

As illustrated in FIG. 8A, as a first example of driving voltages that can be used in the touch display device according to the exemplary embodiment, a logic voltage IoVcc having a low level of about 1.8V and an analog voltage of about 2.8V to about 3.3V are used.

In the data driver, a main supply voltage, i.e. a source reference voltage for a source signal, is required to be ±5V or greater to enable reliable driving, and a gate driving voltage is required to be greater.

Thus, in the embodiment illustrated in FIG. 8A, a source reference voltage of about ±5.5V to about ±6.5V, generated by first boosting an analog voltage, can be used as a main supply voltage of the data driver, and a gate driving voltage of about ±9V, generated by second boosting the analog voltage, can be used.

In the supply voltage configuration as illustrated in FIG. 8A, the LPWG controller according to the exemplary embodiment can generate on/off pulses of S-MUX control signals, based on analog voltages. That is, it is possible to transfer on/off signals having analog voltages as S-MUX control signals.

When an analog voltage of about 2.8V to about 3.3V is used as an S-MUX driving voltage as described above, power consumption can be advantageously minimized.

When the relatively low analog voltage of about 2.8V to about 3.3V is used as the S-MUX driving voltage, the switching stability of the S-MUX elements may be relatively lowered. However, since the S-MUX elements are controlled to be in the on state in the LPWG mode in order to discharge electric charges that may be generated within the display panel and an on signal is transferred to all of the S-MUX elements, even in the case that some of the S-MUX elements are not in the on state, it is expected that electric charges can be sufficiently discharged from the display panel.

Accordingly, since the analog voltage of about 2.8V to about 3.3V is used as the S-MUX driving voltage, it is possible to advantageously maintain the function of discharging electric charges and minimizing power consumption for the same.

As will be described with reference to FIG. 8B, when a direct supply voltage (DSV) of about ±5.5V to ±6.5V is used, the direct supply voltage higher than the analog voltage can be used as the S-MUX driving voltage. This can further improve the feature of discharging electric charges.

FIG. 8B illustrates a second example of driving voltages that can be used in the touch display device according to the exemplary embodiment. In the second example, in addition to the logic voltage IoVcc having a low level of about 1.8V and the analog voltage of about 2.8V to about 3.3V, a direct supply voltage DSV of about ±5.5V to ±6.5V can be used. The direct supply voltage DSV is composed of a VSP signal of +5.5V and a VSN signal of −5.5V.

In the supply voltage configuration illustrated in FIG. 8B, the LPWG controller according to the exemplary embodiment can generate on/off pulses of S-MUX control signals, based on the direct supply voltage.

As described above, a direct supply voltage of about ±5.5V to ±6.5V can be used as an S-MUX driving voltage instead of an analog voltage of about 2.8V to about 3.3V. This can further improve the feature of discharging electric charges.

When the direct supply voltage of about ±5.5V to ±6.5V is used, the direct supply voltage can be directly used as the S-MUX driving voltage without voltage conversion. Thus, the S-MUX elements can be reliably set to be in the on state in the LPWG mode, so that electric charges can be more efficiently discharged.

Even in the case of FIG. 8B in which the direct supply voltage is used, an analog voltage having a low level can be used as an S-MUX driving voltage if only a small amount of electric charges are generated within the display panel. The S-MUX driving voltage may be variably set, depending on the duration of the LPWG mode, the degree of exposure to light, the amount of electric charges generated, or the like.

For example, when the duration of the LPWS is relatively long or the external brightness (the intensity of light) is measured to be high, a large amount of electric charges may be generated within the display panel. Thus, a direct supply voltage of about ±5.5V to ±6.5V is used as the S-MUX driving voltage. When the external brightness (the intensity of light) is measured to be low, an analog voltage of about 2.8V to about 3.3V can be used as the S-MUX driving voltage.

Figure 9:
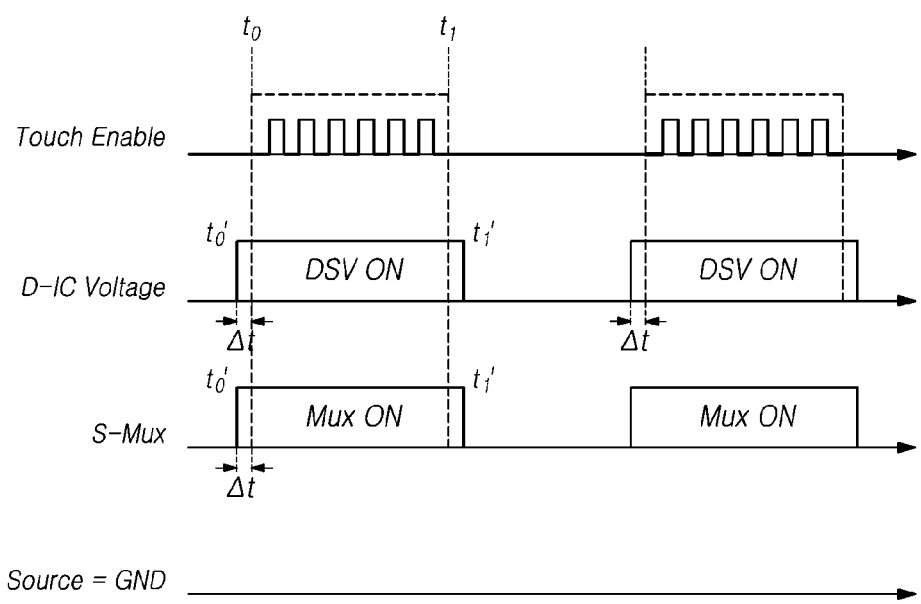
FIG. 9 is a signal timing diagram in the LPWG mode according to another exemplary embodiment.

FIG. 9 is a signal timing diagram in the LPWG mode according to another exemplary embodiment.

In the embodiment described above with reference to FIG. 6, the configuration in which the on/off timing of the S-MUX is accurately synchronized with the on/off timing of the touch enable signal in the LPWG mode.

Alternatively, according to the embodiment illustrated in FIG. 9, an on section of an S-MUX control signal can be set to be greater than an on section of a touch driving signal.

More specifically, as illustrated in FIG. 9, an on timing point t0' of the S-MUX control signal can be configured to precede an off timing point t0 of the touch enable signal by a predetermined section Δt during the LPWG mode, or an off timing point t1' of the S-MUX control signal can be configured to follow an off timing point t1 of the touch enable signal by a predetermined section Δt during the LPWG mode.

As described above, electric charges accumulated in the display panel during the LPWG mode generates DC components, which may have an effect not only on the display function but also on touch driving.

Thus, due to the configuration as illustrated in FIG. 9, during the LPWG mode, electric charges can be discharged at a predetermined time before touch sensing is started. It is thereby possible to prevent touch sensing performance from degrading in the LPWG mode.

Figure 10A:
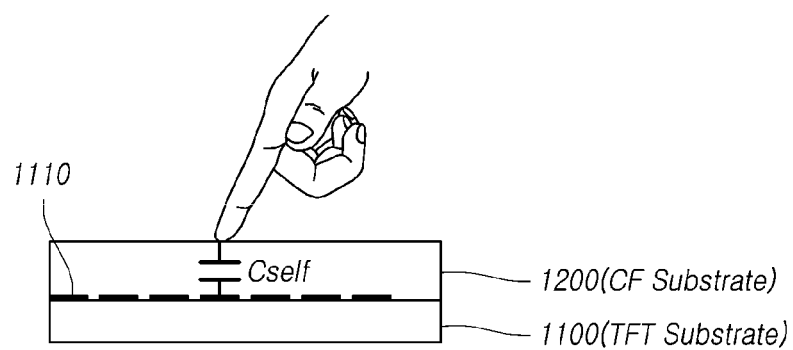
Figure 10B:
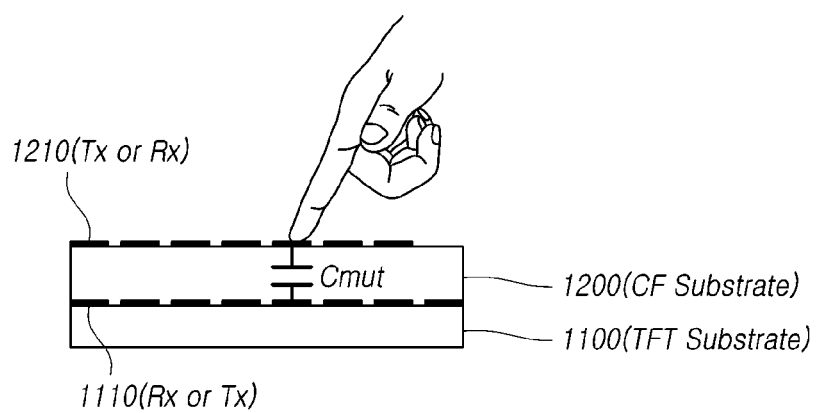

FIG. 10A and FIG. 10B illustrate two examples of touch display panels to which exemplary embodiments are applicable, in which FIG. 10A illustrates an in-cell touch structure, while FIG. 10B illustrates a C1T structure.

The display panel illustrated in FIG. 10A is an in-cell touch display panel that senses an amount of touching pressure by measuring the self-capacitance of touch electrodes, also acting as common electrodes, disposed on a TFT substrate.

The capacitance touch sensing method may be divided into self-capacitance touch sensing and mutual capacitance touch sensing.

The display panel illustrated in FIG. 10A is based on the self-capacitance touch sensing, in which touch electrodes 1110 disposed on a TFT substrate 1100 are only used. As shown in FIG. 10A, a color filter substrate 1200 is on the TFT substrate 1100. Each of the touch electrodes 1110 forms capacitance (self-capacitance) together with a pointer, such as a finger or a stylus. Capacitance values between the touch electrodes and the pointer, such as a finger or a stylus, depending on the presence of the pointer, are measured. Based on the measured capacitance values, a touch and touched coordinates are sensed.

Differently from the mutual capacitance touch sensing, in the self-capacitance touch sensing, the touch electrodes, to which a driving voltage (i.e. a touch driving signal Vtouch_vcom) is applied, sense touches. Thus, according to the self-capacitance touch sensing, there is no distinction between Tx electrodes and Rx electrodes.

The display panel illustrated in FIG. 10B is based on the mutual capacitance touch sensing, which may also be referred to as C1T touch sensing.

In the touch sensing illustrated in FIG. 10B, in addition to first touch electrodes 1110 disposed on the TFT substrate 1100 to also act as common electrodes, second touch electrodes 1210 are disposed on a color filter substrate 1200 to measure an amount of mutual capacitance between two electrodes in response to a touch input.

Specifically, the first touch electrodes 1110 and the second touch electrodes 1210 are arranged in rows and columns. Some of the touch electrodes arranged in one direction are Tx electrodes (also referred to as driving electrodes) to which a driving voltage is applied, while the remaining touch electrodes arranged in the other direction are Rx electrodes (also referred to as sensing electrodes) that sense driving voltages and form capacitance together with the Tx electrodes. Then, a touch and touched coordinates can be sensed based on changes in the capacitance (mutual capacitance) between the Tx electrodes and the Rx electrodes depending on the presence of a pointer, such as a finger or a stylus.

The touch display device according to exemplary embodiments can employ one of the above-described two capacitance touch sensing methods (i.e. mutual capacitance touch sensing and self-capacitance touch sensing). However, the present disclosure is not limited thereto, and the touch display device may employ any other touch sensing methods.

Figure 11:
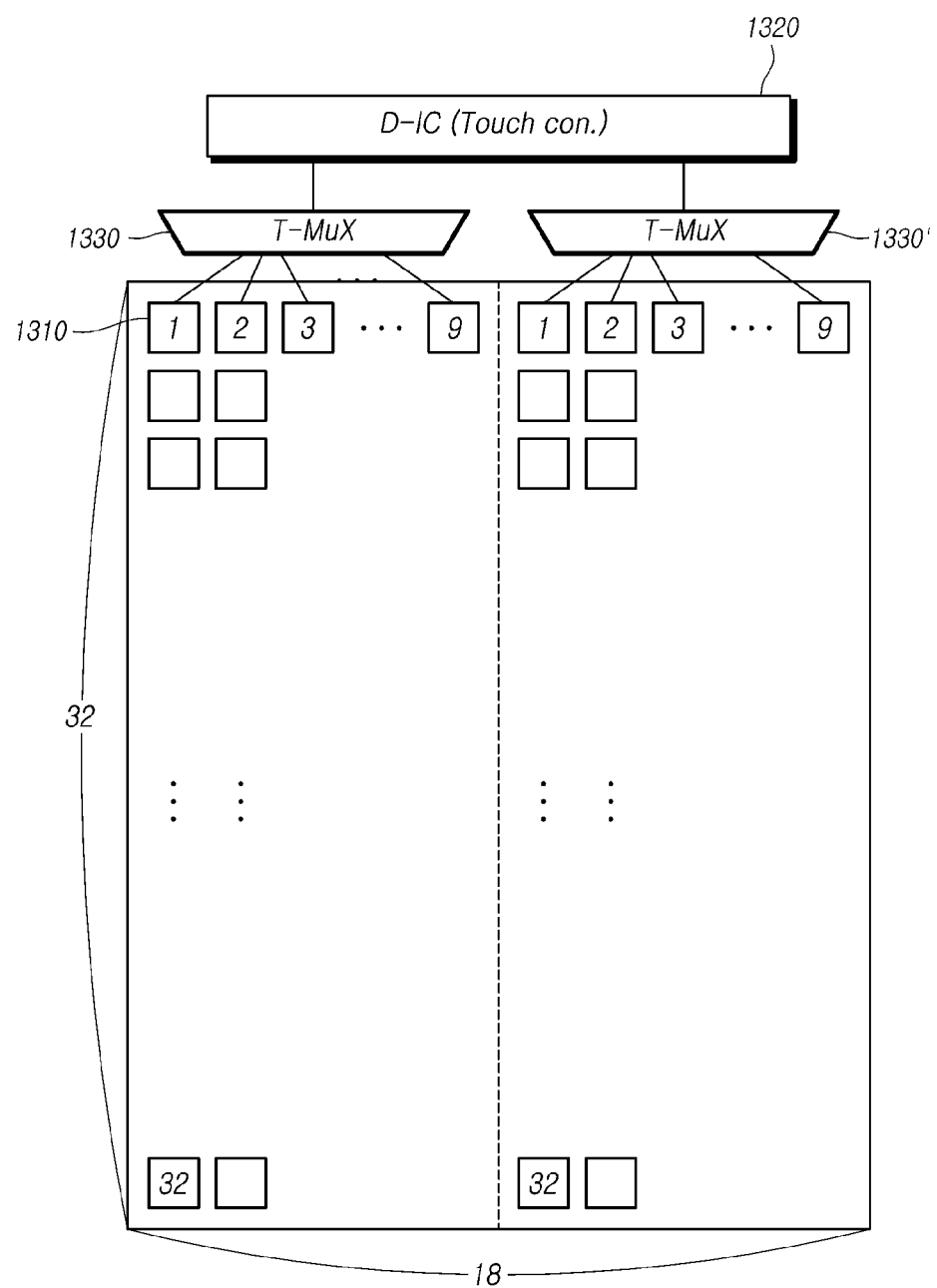
FIG. 11 illustrates an example of a structure of the display device according to the exemplary embodiment.

FIG. 11 illustrates an example of a specific structure of the display device according to the exemplary embodiment.

For reference, FIG. 11 selectively illustrates touch electrodes and the like for realizing a touch sensing function without illustrating data lines and S-MUX elements.

The touch display device according to the exemplary embodiment includes a plurality of touch block groups in which touch electrodes are disposed in the display panel, each of the touch block groups including a plurality of touch blocks.

For example, as illustrated in FIG. 11, the entirety of the touch electrodes are divided into a first touch block group including k number of touch blocks disposed on the left (i.e. in a first area) of the display panel and a second touch block group including k number of touch blocks disposed on the right (i.e. in a second area) of the display panel. Each of the touch blocks of the first and second touch block groups includes m number of rows of touch electrodes.

As illustrated in FIG. 11, the number of the touch blocks of the first touch block group disposed on the left of the display panel is 9, while the number of the touch blocks of the second touch block group disposed on the right of the display panel is 9. Each of the touch blocks includes 32 touch electrodes arranged in the columnar direction.

Accordingly, a total of 18×32 number of touch electrodes are disposed in the display panel. The touch electrodes and the touch blocks are not required to be the same size and number. For example, a touch electrode block located in the periphery of the display panel may include touch electrode blocks or touch electrodes having a smaller size or a smaller number of touch electrode blocks or touch electrodes, so that uniform touch sensitivity can be achieved.

In addition, further provided are touch multiplexers (T-MUXs) 1330 and 1330' for switching the transfer of touch driving signals to the plurality of touch electrodes of the touch blocks of the first touch block group and the touch blocks of the second touch block group. The touch multiplexers include the first touch multiplexer 1330 managing the touch blocks of the first touch block group on the left and the second touch multiplexer 1330' managing the touch blocks of the second touch block group on the right.

As will be described below, the first touch multiplexer 1330 performs touch sensing by sequentially providing a touch driving signal to a total of 9 touch blocks of the first touch block group, and the second touch multiplexer 1330' performs touch sensing by sequentially providing a touch driving signal to a total of 9 touch blocks of the second touch block group.

The first touch multiplexer 1330 and the second touch multiplexer 1330' may operate in a symmetrical manner.

Specifically, when the first touch multiplexer 1330 transfers a touch driving signal to the $i^{th}$ touch block of the first touch block group, the second touch multiplexer 1330' also transfers a touch driving signal to the $i^{th}$ touch block of the second touch block group.

In addition, each touch multiplexer controls a touch driving signal to be sequentially transferred to the k number of touch blocks of the first touch block group and the k number of touch blocks of the second touch block group during a single touch-on section in the LPWG mode. This will be described in more detail below with reference to FIG. 13.

Figure 12:
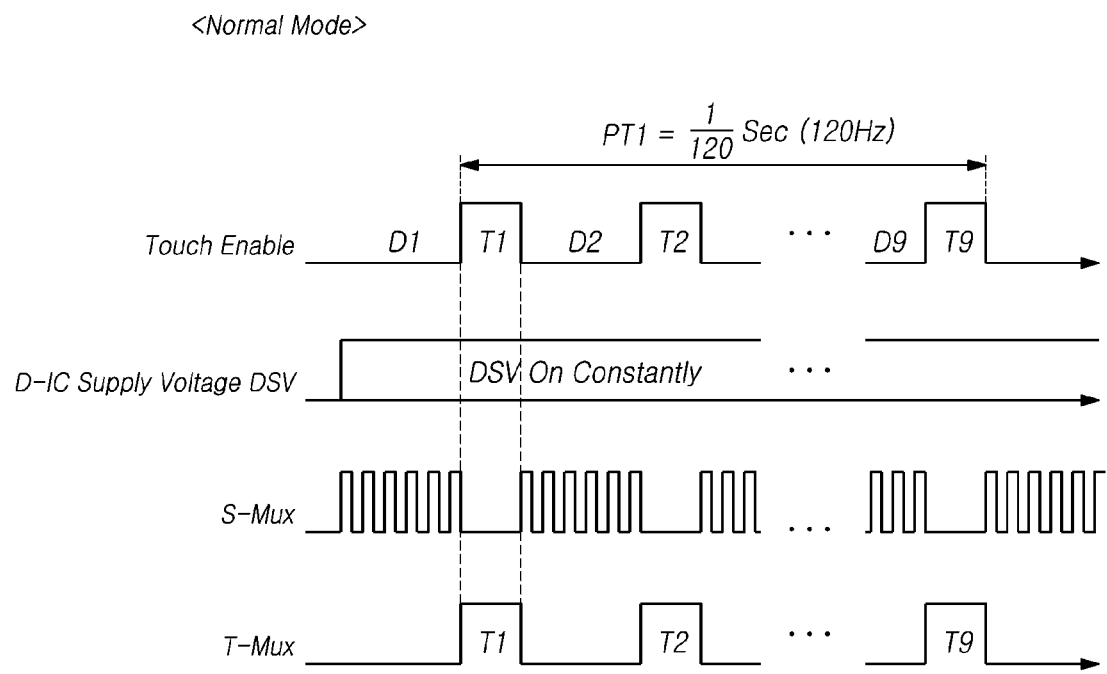
FIG. 12 illustrates a signal timing diagram of the display panel, illustrated in FIG. 11, in the normal mode.
Figure 13:
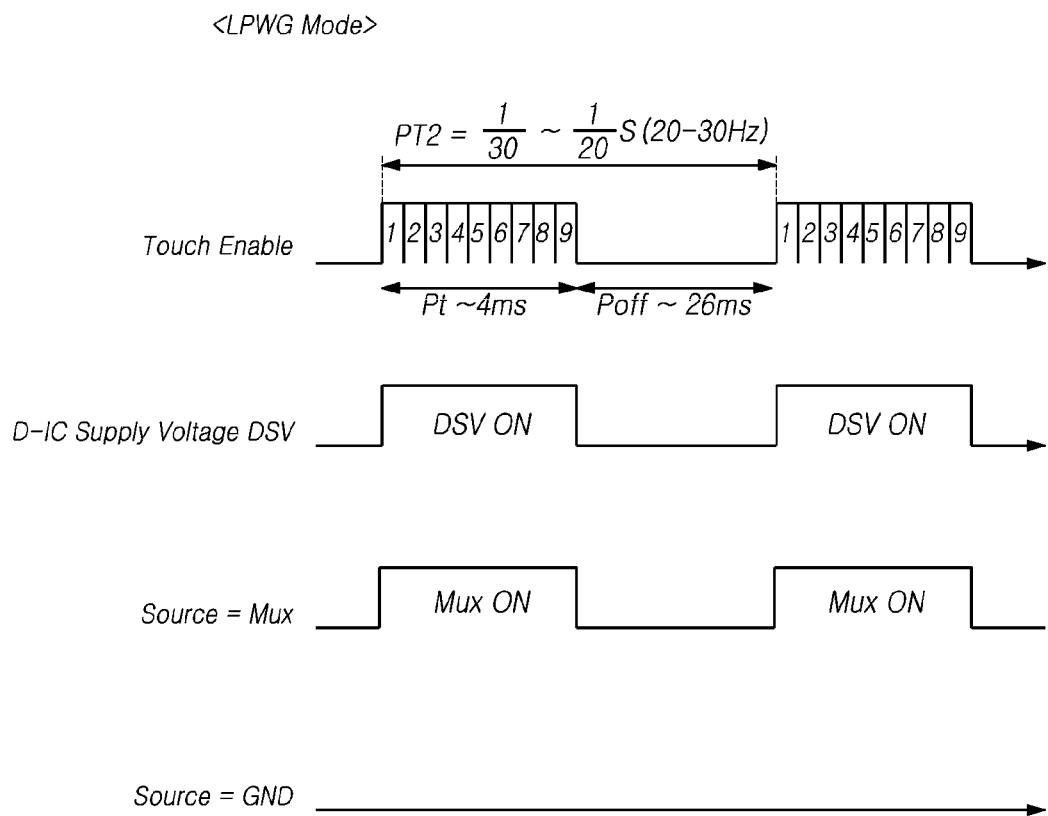
FIG. 13 illustrates a signal timing diagram of the display panel, illustrated in FIG. 11, in the LPWG mode.

FIG. 12 illustrates a signal timing diagram of the display panel, illustrated in FIG. 11, in the normal mode, and FIG. 13 illustrates a signal timing diagram of the display panel, illustrated in FIG. 11, in the LPWG mode.

As illustrated in FIG. 12, the normal mode is time-divided such that display operation modes and touch operation modes can recur.

In display operation modes D1, D2, and . . . , S-MUX signals are provided such that S-MUX elements (not shown) connected to the data lines can be sequentially set to be in an on state. At the same time, a touch enable signal and touch multiplexers are in off states.

In contrast, in touch operation modes T1, T2, . . . , and T9, the S-MUX elements are in an off state, but the touch enable signal and the touch multiplexers are in on states.

In the normal mode as described above, a data driver (D-IC) supply voltage is constantly maintained in an on state.

In the display device illustrated in FIG. 11, in the first touch operation mode section T1, a touch driving signal is only transferred to the first touch block of the first touch block group and the first touch block of the second touch block group under the control of the touch multiplexer. In the second touch operation mode section T2, a touch driving signal is only transferred to the second touch block of the first touch block group and the second touch block of the second touch block group under the control of the touch multiplexer.

When the ninth touch operation mode section T9 is completed, the touch sensing of the entire display panel is completed. The process may take about 1/120 second.

Thus, in the normal mode, the frequency of touch sensing, i.e. the number of times per second the touch sensing is performed on the entire display panel, is 120 Hz.

As illustrated in FIG. 13, in the LPWG mode, touch-on sections Pt and touch-off sections Poff recur in an alternating manner.

In addition, in the touch-on sections Pt, the touch multiplexer sequentially transfers a touch driving signal to 9 touch blocks of the first touch block group and 9 touch blocks of the second touch block group so that touch sensing is performed. Thus, the touch sensing of the entire display panel can be completed during a single touch-on section.

According to the structure illustrated in FIG. 11, each of the touch-on sections of the LPWG mode is divided into 9 sub-sections (k=9). The touch multiplexer can control a touch driving signal to be sequentially transferred to 9 touch blocks of the first touch block group and 9 touch blocks of the second touch block group during each sub-section.

Specifically, in the first sub-section, a touch driving signal is only transferred to the first touch block of the first touch block group and the first touch block of the second touch block group, and in the second sub-section, a touch driving signal is only transferred to the second touch block of the first touch block group and the second touch block of the second touch block group.

In the LPWG mode, during the touch-on sections Pt in which a touch enable signal is on, a data driving voltage is on. In this case, an S-MUX control signal is transferred so that the source multiplexer can be set to be in an on state. Thus, electric charges generated within the display panel are discharged.

During the touch-off sections Poff, all of the touch enable signal, the data driver supply voltage, and the source multiplexer are off. Across all sections of the LPWG mode, the source signal is maintained in the ground state.

The total length of a single touch-on section Pt and a single touch-off section Poff, in particular, a touch sensing period in the LPWG mode, may be about 1/30 to 1/20 second.

The touch-off section Poff may be configured to be longer than the touch-on section Pt. For example, the touch-on section may be about 4 ms, while the touch-off section may be about 26 ms to about 30 ms.

In addition, since the display device performs touch sensing by transferring a touch driving signal to all of the touch electrodes of the display panel during a single touch-on section, a touch sensing frequency in the LPWG mode is about 20 Hz to about 30 Hz.

In the normal mode, a touch input performed by a user for display manipulation is required to be sensed for a reduced period of time. In contrast, in the LPWG mode in which the display function is off, it is not required to perform touch sensing for a reduced period of time as in the normal mode, since it is only required to sense a touch input signal (e.g. double tapping) that wakes up the display panel.

Thus, in the LPWG mode, the touch sensing frequency is set to be about 20 Hz to 30 Hz, which is lower than the touch sensing frequency 120 Hz in the normal mode. This can consequently minimize power consumption in the LPWG mode.

In addition, in a single touch sensing period, the touch-off section Poff is set to be longer than the touch-on section Pt. It is thereby possible to further reduce power consumption in the LPWG mode.

Furthermore, as illustrated in FIG. 11, the touch electrodes of the display panel may be arranged in a symmetrical structure. Touch sensing can be performed by sequentially transferring a touch driving signal to all of the touch electrodes of the display panel during a single touch-on section. Consequently, touch driving in the LPWG mode can be optimized.

In addition, as illustrated in FIG. 11, a plurality of touch electrodes are grouped according to blocks and are arranged in a symmetrical manner. The plurality of touch electrodes are sequentially controlled using the T-MUX. It is thereby possible to improve touch sensing efficiency in the normal mode and the LPWG mode.

As set forth above, the use of the touch display device according exemplary embodiments makes it possible to discharge undesirable electric charges generated within the display panel, thereby preventing display defects due to accumulation of the electric charges, in the LPWG mode of the display panel in which a touch input is only sensed in a state in which the display function is off to reduce power consumption.

In particular, in the touch display panel including the S-MUX elements for switching the transfer of source signals to the data lines, S-MUX control signals are provided to set the S-MUX elements in the on position, in synchronization with a touch sensing section in which a touch driving signal is provided. This makes it possible to discharge electric charges generated within the display panel, thereby preventing display defects due to the electric charges.

The foregoing descriptions and the accompanying drawings have been presented in order to explain the certain principles of the present disclosure. A person skilled in the art to which the present disclosure relates could make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended claims and all of their equivalents fall within the scope of the present disclosure.

What is claimed is:

1. A touch display device comprising:
   a touch display panel comprising pixels and touch electrodes for touch sensing, the pixels defined by intersection of gate lines with data lines, the touch display panel configured to operate in a first mode or a second mode, wherein during the first mode the touch display panel is configured to display an image and sense touch on the touch display panel, and during the second mode the touch display panel is configured to sense touch on the display panel but the touch display panel is prevented from displaying any image;
   a data driver configured to transfer source signals to the data lines of the touch display panel to display the image during the first mode, and the data driver configured to transfer a predetermined voltage to the data lines of the touch display panel during the second mode;
   a source multiplexer disposed between the data driver and the data lines, the source multiplexer configured to transmit the source signals to the touch display panel via the data lines during the first mode and transmit the predetermined voltage to the touch display panel via the data lines during the second mode; and
   a low power wake-up gesture controller configured to transmit a control signal to the source multiplexer during the second mode to turn on the source multiplexer during the second mode, the control signal synchronized with a touch driving signal transmitted to the touch electrodes for sensing touch during the second mode;
   wherein during the second mode the source multiplexer electrically connects the touch display panel with the predetermined voltage transferred by the data driver.

2. The touch display device according to claim 1, wherein a pulse width of a section of the control signal that turns on the source multiplexer is greater than or equal to a pulse width of the touch driving signal for sensing touch.

3. The touch display device according to claim 1, wherein the data driver operates using an analog voltage, a direct supply voltage having a higher potential difference than the analog voltage, and a gate voltage produced by increasing the direct supply voltage, and wherein the control signal is generated based on the direct supply voltage.

4. The touch display device according to claim 1, wherein the data driver operates using an analog voltage, a source reference voltage produced by increasing the analog voltage to a first voltage, and a gate voltage produced by increasing the analog voltage to a second voltage that is greater than the first voltage, and wherein the control signal is the analog voltage.

5. The touch display device according to claim 1, wherein the second mode comprises alternating periods of time for sensing touch and for not sensing touch, the periods of time for not-sensing touch being longer than the periods of time for sensing-touch.

6. The touch display device according to claim 5, wherein during a period of time for sensing touch the touch driving signal is transmitted to all of the touch electrodes of the touch display panel.

7. The touch display device according to claim 1, wherein a frequency of the touch driving signal during the second mode is less than a frequency of the touch driving signal during the first mode.

8. The touch display device according to claim 7, wherein frequency of the touch driving signal during the second mode ranges from 20 Hz to 30 Hz, and the frequency of the touch driving signal during the first mode is 120 Hz.

9. The touch display device according to claim 1, wherein the touch electrodes comprise a plurality of touch block groups disposed in the display panel, each of the plurality of touch block groups comprising a plurality of touch blocks.

10. The touch display device according to claim 9, wherein the plurality of touch block groups comprise a first touch block group including k number of touch electrodes disposed in a first area of the display panel, and a second touch block group including k number of touch electrodes disposed in a second area of the display panel, wherein the first touch block group and the second touch block group are symmetrically disposed in the touch display panel,
   wherein the touch display device further comprises a touch multiplexer, the touch multiplexor configured to transfer the touch driving signal to the touch electrodes included in the touch blocks of the first touch block group and the touch blocks of the second touch block group during the first mode and the second mode,
   wherein the touch multiplexer is configured to sequentially transfer the touch driving signal to the k number of touch blocks of the first touch block group and the k number of touch blocks of the second touch block group during a period of time for sensing touch the touch driving signal during the second mode.

11. The touch display device according to claim 1, wherein the pre-determined voltage is a ground voltage and the data driver is configured to transfer only the ground voltage to the data lines in the second mode.

12. The touch display device according to claim 1, wherein the touch display panel is configured to switch from the second mode to the first mode responsive to sensing touch during the second mode.

13. A method of operating a touch display device comprising a touch display panel, the method comprising:
   during a first mode of the touch display panel, displaying an image on the touch display panel and sensing touch on the touch display panel;
   during a second mode of the touch display panel, sensing touch on the touch display panel and disabling the touch display panel from displaying any image; and
   during the second mode of the touch display panel, turning on a source multiplexer that is connected to the touch display panel using a control signal, the source multiplexer configured to transmit a predetermined voltage from a data driver to the touch display panel via data lines of the touch display panel during the second mode to disable the touch display panel from displaying any image,
   wherein the control signal used to turn on the source multiplexer is synchronized with a touch driving signal transmitted to touch electrodes of the touch display panel to sense touch during the second mode.

14. The method of claim 13, further comprising:
during the second mode, sensing touch on the touch display panel; and
responsive to sensing touch during the second mode, switching the touch display panel from the second mode to the first mode.

15. The method of claim 13, wherein the predetermined voltage is a ground voltage and during the second mode the data driver transmits only the ground voltage to the touch display panel via the data lines.

16. The method of claim 13, wherein a pulse width of a section of the control signal that turns on the source multiplexer is greater than or equal to a pulse width of the touch driving signal for sensing touch.

17. The method of claim 13, wherein the second mode comprises alternating periods of time for sensing touch and for not sensing touch, the periods of time for not-sensing touch being longer than the periods of time for sensing-touch.

18. The method of claim 17, further comprising:
transferring the touch driving signal to all the touch electrodes of the touch display panel during a period of time for sensing touch.

19. The method of claim 13, wherein a frequency of the touch driving signal is less than a frequency of the touch driving signal during the first mode of the touch display panel.

20. The method of claim 19, wherein frequency of the touch driving signal during the second mode ranges from 20 Hz to 30 Hz, and the frequency of the touch driving signal during the first mode is 120 Hz.

\* \* \* \* \*